United States Patent
Baier et al.

(10) Patent No.: US 8,955,385 B2
(45) Date of Patent: Feb. 17, 2015

(54) PRESSURE MONITORING SYSTEM INCLUDING MULTIPLE PRESSURE SWITCHES

(75) Inventors: Roland Baier, Esslingen (DE); Stefan Pfund, Baden-Wurttemberg (DE)

(73) Assignee: Norgren GmbH, Alpen (DE)

( * ) Notice: Subject to any disclaimer, the term of this patent is extended or adjusted under 35 U.S.C. 154(b) by 434 days.

(21) Appl. No.: 13/381,989

(22) PCT Filed: Jul. 7, 2010

(86) PCT No.: PCT/EP2010/004091
§ 371 (c)(1),
(2), (4) Date: Jan. 3, 2012

(87) PCT Pub. No.: WO2011/003584
PCT Pub. Date: Jan. 13, 2011

(65) Prior Publication Data
US 2012/0111121 A1  May 10, 2012

Related U.S. Application Data

(60) Provisional application No. 61/224,144, filed on Jul. 9, 2009.

(51) Int. Cl.
*G01L 9/00* (2006.01)
*G05D 16/06* (2006.01)
*H01H 35/26* (2006.01)

(52) U.S. Cl.
CPC ........ *G05D 16/0605* (2013.01); *H01H 35/2614* (2013.01)
USPC .............................................. 73/753; 73/700

(58) Field of Classification Search
None
See application file for complete search history.

(56) References Cited

U.S. PATENT DOCUMENTS

| 2,927,984 | A |   | 3/1960 | Turek |
|---|---|---|---|---|
| 4,079,215 | A |   | 3/1978 | Berggren |
| 4,796,652 | A |   | 1/1989 | Hafla |
| 4,939,321 | A | * | 7/1990 | Tanaka et al. ................. 200/83 P |
| 5,082,021 | A | * | 1/1992 | Yonezawa ................... 137/596.2 |
| 5,308,939 | A | * | 5/1994 | Sasaki .......................... 200/83 R |
| 5,934,766 | A | * | 8/1999 | Feigel et al. ................ 303/119.2 |
| 6,708,552 | B2 | * | 3/2004 | Weldon .............................. 73/40 |
| 7,718,907 | B2 | * | 5/2010 | Wildman .................... 200/83 Q |
| 2010/0154311 | A1 | * | 6/2010 | Condon et al. .................. 49/358 |

FOREIGN PATENT DOCUMENTS

| DE | 3625222 A1 | 2/1988 |
|---|---|---|
| RU | 2130595 C1 | 5/1999 |
| RU | 2263292 C1 | 10/2005 |
| WO | 8102062 A1 | 7/1981 |

* cited by examiner

*Primary Examiner* — Lisa Caputo
*Assistant Examiner* — Jermaine Jenkins
(74) *Attorney, Agent, or Firm* — The Ollila Law Group LLC

(57) ABSTRACT

A pressure monitoring system (200) is provided. The pressure monitoring system (200) includes a housing (201) and a fluid port (202) formed in the housing (201). The pressure monitoring system (200) also includes a first pressure switch (204) positioned within at least a portion of the housing (201). The first pressure switch (204) is in fluid communication with the fluid port (202). The pressure monitoring system (200) also includes a second pressure switch (205) positioned within at least a portion of the housing (201). The second pressure switch (205) is also in fluid communication with the fluid port (202).

12 Claims, 4 Drawing Sheets

PRESSURE MONITORING SYSTEM INCLUDING MULTIPLE PRESSURE SWITCHES

TECHNICAL FIELD

The present invention relates to, a pressure monitoring system, and more particularly, to a pressure monitoring system with multiple pressure switches in a single housing.

BACKGROUND OF THE INVENTION

Pressure switches are incorporated in a wide variety of applications for controlling a device based on a pre-determined pressure. For example, if a pressure switch is in communication with a fluid (liquid or gas) supply, the pressure switch can activate once the pressure supply reaches a pre-determined pressure threshold. Similarly, the pressure switch may de-actuate at pressures substantially below the pre-determined pressure threshold. Conversely, the pressure switch could optionally de-actuate when the pressure supply reaches the pre-determined pressure threshold and actuate when the pressure supply returns to below the pre-determined pressure threshold. Thus, pressure switches can be used to determine whether the fluid pressure is above or below a pre-determined pressure threshold.

In some situations, it may be desirable to maintain a fluid pressure within a specified pressure range. Typically, in order to accomplish this, at least two pressure switches are required. A first pressure switch can monitor a low pressure threshold by actuating if the fluid pressure drops below the low pressure threshold, for example. A second pressure switch can be provided to monitor a high pressure threshold by actuating if the fluid pressure exceeds the high pressure threshold. If neither pressure switch is actuated, the fluid pressure is assumed to be somewhere between the upper and lower pressure thresholds. FIG. 1 shows such a configuration.

FIG. 1 shows a prior art pressure monitoring system 100. The pressure monitoring system 100 includes a fluid source 101 with two fluid hoses exiting from the fluid source 101. Each of the hoses 107, 108 are coupled between the fluid source 101 and a pressure switch 105, 106, respectively. The pressure monitoring system 100 is designed to monitor the pressure of the fluid source 101 using the first pressure switch 105 and the second pressure switch 106. The pressurized fluid source 101 may be in communication with another device that uses the pressure to perform some action. Each pressure switch 105, 106 includes electrical contacts 109, which are used to communicate with an external device, such as a processor (not shown) in order to send/receive signals indicating the actuation state of the pressure switch. The pressure switches 105, 106 may be provided with one pressure switch actuating at a low pressure threshold and one pressure switch actuating at a high pressure threshold.

Although the pressure monitoring system 100 can provide adequate results in limited circumstances, one major problem with the above configuration is the requirement of excess piping and/or fluid fittings. Each opening in both the pressure switches 105, 106 as well as the fluid source 101 requires an individual fluid fitting. Each fluid fitting not only increases the cost of the system, but also increases the potential fluid leak locations. Therefore, the number of fittings should be kept to a minimum. However, when two or more pressure switches are required, the number of fittings can quickly increase. In addition, because the pressure monitoring system 100 requires at least three main components, i.e., a fluid source 101, a first pressure switch 105, and a second pressure switch 106; the pressure monitoring system 100 requires a substantial amount of space. In certain applications the available space may be limited requiring a re-configuration of the entire system in order to accommodate the pressure monitoring system 100. In addition, each pressure switch is an independent component and therefore, each pressure switch has its own electrical connector, thereby increasing the number of required mating components. Therefore, it can be appreciated that such a solution has serious drawbacks.

The present invention overcomes this and other problems by providing a single housing pressure monitoring system with at least two independent pressure switching points. Advantageously, the number of required fittings is reduced as only one fitting is required to connect to the housing.

SUMMARY OF THE INVENTION

A pressure monitoring system is provided according to an embodiment of the invention. The pressure monitoring system includes a housing and a fluid port formed in the housing. The pressure monitoring system can also include a first pressure switch positioned within at least a portion of the housing and in fluid communication with the fluid port. The pressure monitoring system can also include a second pressure switch positioned within at least a portion of the housing and in fluid communication with the fluid port.

A method for forming a pressure monitoring system is provided according to an embodiment of the invention. The pressure monitoring system includes a housing and a fluid port formed in the housing. The method comprises the step of positioning a first pressure switch in at least a portion of the housing such that the first pressure switch is in fluid communication with the fluid port. The method also comprises the step of positioning a second pressure switch in at least a portion of the housing such that the second pressure switch is in fluid communication with the fluid port.

ASPECTS

According to an aspect of the invention, a pressure monitoring system comprises:
a housing;
a fluid port formed in the housing;
a first pressure switch positioned within at least a portion of the housing and in fluid communication with the fluid port; and
a second pressure switch positioned within at least a portion of the housing and in fluid communication with the fluid port.

Preferably, the pressure monitoring system further comprises a first pressure switch aperture formed in the housing and adapted to receive the first pressure switch and at least a second pressure switch aperture formed in the housing and adapted to receive the second pressure switch.

Preferably, the pressure monitoring system further comprises a fluid channel formed in the housing and providing a fluid communication path between the fluid port and the first and second pressure switches.

Preferably, the pressure monitoring system further comprises an electrical connector extending from the housing and in communication with the first pressure switch and the second pressure switch.

Preferably, the pressure monitoring system further comprises:
a first adjustment member adapted to adjust a threshold actuation pressure of the first pressure switch; and a second adjustment member adapted to adjust a threshold actuation pressure of the second pressure switch.

Preferably, one of the first or second pressure switches comprises a backup pressure switch and the first and second pressure switches are configured to actuate at substantially the same pressure.

According to another aspect of the invention, a method for forming a pressure monitoring system including a housing and a fluid port formed in the housing, comprises the steps of:

positioning a first pressure switch in at least a portion of the housing such that the first pressure switch is in fluid communication with the fluid port; and positioning a second pressure switch in at least a portion of the housing such that the second pressure switch is in fluid communication with the fluid port.

Preferably, the step of positioning the first pressure switch comprises inserting the first pressure switch into a first pressure switch aperture formed in the housing and wherein the step of positioning the second pressure switch comprises inserting the second pressure switch into a second pressure switch aperture formed in the housing.

Preferably, a fluid channel formed in the housing provides fluid communication between the fluid port and the first and second pressure switches.

Preferably, the method further comprises the steps of extending an electrical connector from the housing and providing electrical communication between the electrical connector and the first pressure switch and the second pressure switch.

Preferably, the method further comprises the steps of
adjusting the first pressure switch to actuate at a first threshold actuation pressure; and
adjusting the second pressure switch to actuate at a second threshold actuation pressure.

Preferably, one of the first or second pressure switches comprises a backup pressure switch and the first and second pressure switches are configured to actuate at substantially the same pressure.

DETAILED DESCRIPTION OF THE INVENTION

FIGS. 2-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
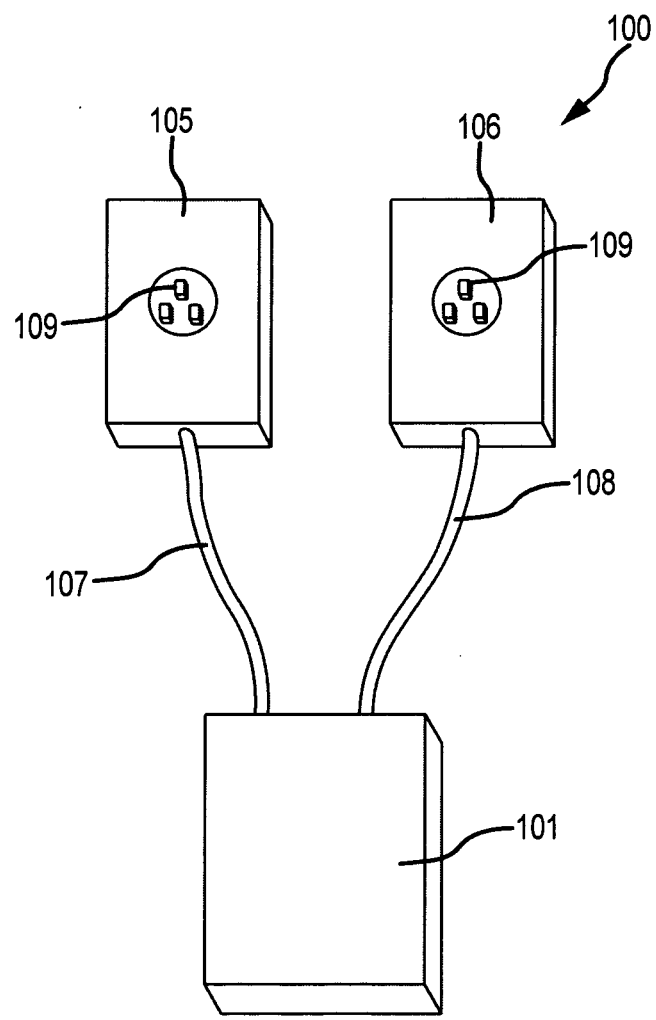
FIG. 1 shows a prior art pressure monitoring system.
Figure 2:
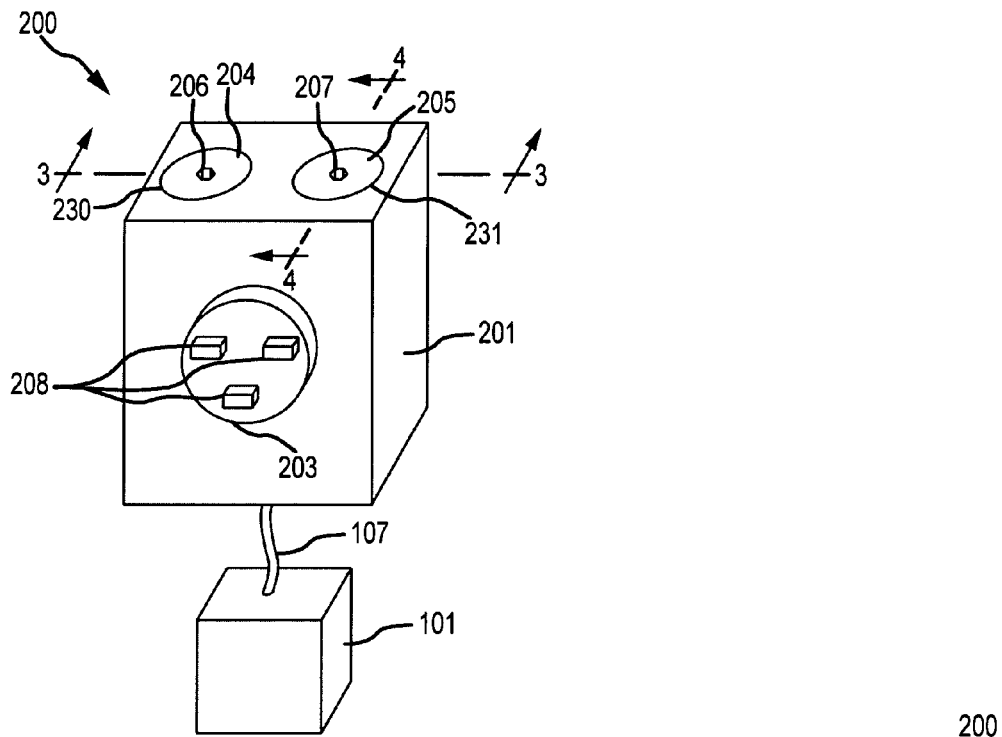
FIG. 2 shows a pressure monitoring system according to an embodiment of the invention.

FIG. 2 shows a pressure monitoring system 200 according to an embodiment of the invention. The pressure monitoring system 200 comprises a housing 201, a fluid port 202 (not visible in FIG. 2), an electrical connector 203, two or more pressure switch apertures 230, 231, and two or more pressure switches 204, 205. While only two pressure switches 204, 205 are shown in the figures, it should be appreciated that more than two pressure switches may be utilized.

The pressure monitoring system 200, and more specifically, the fluid port 202, can be coupled to a variety of devices that include pressurized fluid. Therefore, the fluid port 202 can be in communication with a pressurized fluid source 101. In the embodiment shown, the fluid port 202 is in fluid communication with the pressurized fluid source 101 via a conduit 107. The pressurized fluid can be a gas, liquid, or a combination thereof. The pressurized fluid may comprise a part of a variety of systems, including, but not limited to valve systems, actuation systems, braking systems, such as rail car braking systems, etc. The particular system associated with the pressurized fluid should in no way limit the scope of the present invention. When the pressure monitoring system 200 is in communication with a fluid, the pressurized fluid acts on the first and second pressure switches 204, 205 to either actuate or de-actuate an associated switch (See FIG. 4). Therefore, the pressure monitoring system 200 can signal when the fluid pressure reaches a threshold level. The precise action that takes place in response to the actuation of the switch is not important for the purposes of the present invention and therefore should not limit the scope of the present invention.

According to an embodiment of the invention, the pressure switches 204, 205 may be adjustable. For example, the threshold pressure at which the pressure switches 204, 205 actuate can be adjusted by adjustment members 206, 207, respectively. Advantageously, the threshold actuation pressure of the first pressure switch 204 may be different from the threshold actuation pressure of the second pressure switch 205, for example. Alternatively, the pressure switches 204, 205 may be chosen based on their pre-determined threshold actuation pressure values. If the desired threshold pressures change, the pressure switches 204, 205 may be exchanged with other suitable pressure switches.

According to an embodiment of the invention, the first pressure switch 204 may be used to indicate that the pressure supplied to the pressure monitoring system 200 has reached a low pressure threshold and the second pressure switch 205 may be used to indicate that the pressure supplied to the pressure monitoring system 200 has exceeded a high pressure threshold. Such a configuration may be useful in situations where it is desirable to maintain the fluid pressure within a certain pressure range and both low pressures and high pressures outside of the pressure range are undesirable. The electrical connector 203 can include one or more contact members 208, which can be used to couple the pressure monitoring system 200 to a variety of devices, such as a processing system, a CPU, other circuits, or an emergency shut-off valve, for example. However, the invention should not be limited to the devices listed, and the contact members 208 can couple the pressure monitoring system 200 to any number of other devices.

Figure 3:
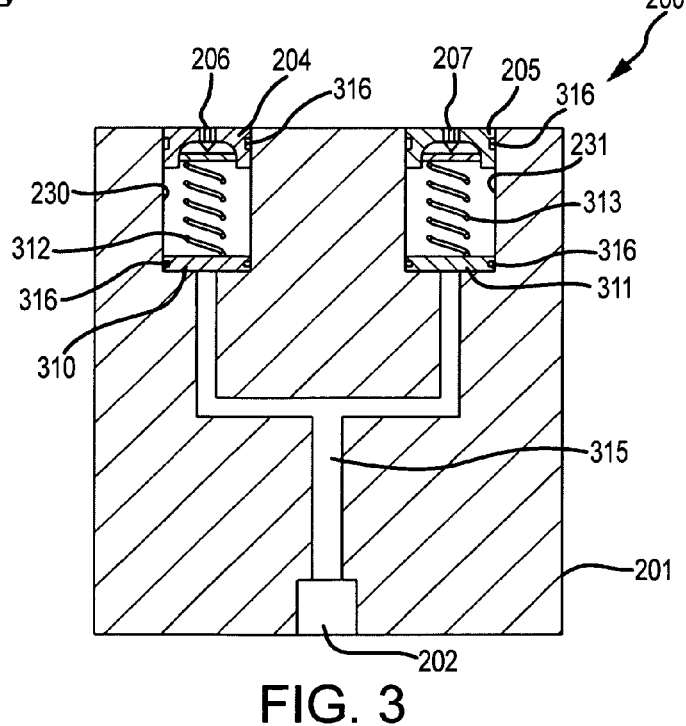
FIG. 3 shows a cross-sectional view of the pressure monitoring system according to an embodiment of the invention.

FIG. 3 shows a cross-sectional view of the pressure monitoring system 200 according to an embodiment of the invention taken along line 3-3 of FIG. 2. Visible in FIG. 3 is the fluid port 202. Although the fluid port 202 is shown as being formed in the bottom of the housing 101, it should be appreciated that the fluid port 202 could be formed in any side of the housing 101 and the particular location should not limit the scope of the present invention. As can be seen, the fluid port 202 is in fluid communication with both the first pressure switch 204 and the second pressure switch 205 via fluid channel 315, which branches off to each pressure switch aperture 230, 231. Therefore, fluid entering the pressure monitoring system 200 through the fluid port 202 acts on both the first pressure switch 204 and the second pressure switch 205 with substantially equal pressures. As can easily be appreciated, only one fluid fitting is required between the associated device(s), such as the pressurized fluid source 101 and the pressure monitoring system 200. This is in contrast to prior art designs, which require multiple fluid fittings when multiple pressure switches are employed. Advantageously, the present invention can reduce the number of fittings without minimizing the number of pressure switches. The fluid port 202 may include a threaded surface in order to accept a fluid fitting, or alternatively, various fluid fittings could be coupled to the fluid port 202 according to other well known methods. The particular method used to couple the pressurized fluid to the fluid port 202 is not important for purposes of the present invention and therefore, should not limit the scope of the present invention.

In the embodiment shown, the pressure switch apertures 230, 231 are formed in the housing 101 and are adapted to receive a pressure switch, such as the pressure switches 204, 205. A pressure switch 204, 205 can be inserted into the pressure switch aperture 230, 231. One or more sealing members 316 can provide a fluid tight seal between a pressure switch 204, 205 and the associated pressure switch apertures 230, 231. The seals 316 can allow the pressure switches 204, 205 to be easily removed if desired. According to other embodiments, the pressure switches 204, 205 may be substantially permanently coupled to the pressure switch apertures 230, 231 according to known methods. However, allowing the pressure switches 204, 205 to be removably coupled in the pressure switch apertures 230, 231 can allow the pressure switches 204, 205 to be easily replaced and exchanged. This allows the pressure monitoring system 200 to be easily configured to accommodate a much wider range of pressures.

In the embodiment shown in FIG. 3, the pressure switches 204, 205 comprise movable pistons 310, 311 and biasing members 312, 313. The biasing members 312, 313 are shown as comprising springs; however, it should be appreciated that other biasing members may be used and the present invention should not be limited to the use of springs. Furthermore, it should be appreciated that the pressure switches 204, 205 shown are merely examples, and a wide variety of different types of pressure switches may be used, such as for example, pressure switches actuated by the flexing of a diaphragm. Therefore, the particular pressure switches shown and discussed should not limit the scope of the present invention.

According to an embodiment of the invention, the pressure switches 204, 205 include adjustment members 206, 207. The adjustment members 206, 207 may engage the biasing members 312, 313 to adjust the threshold pressure at which the pressure switches 204, 205 actuate. According to the embodiment shown, the adjustment members 206, 207 may be configured to adjust the compression of the biasing members 312, 313, for example. According to the embodiment shown, the adjustment members 206, 207 may threadedly engage the pressure switches 204, 205 such that rotation in a first direction raises the adjustment member to decrease the compression of the biasing member while rotation in a second direction lowers the adjustment member to increase the compression of the biasing member. As can easily be appreciated, as the compression of the biasing member 312, 313 decreases, the threshold pressure required to actuate the piston 310, 311 decreases. Conversely, as the compression of the biasing member 312, 313 increases, the threshold pressure required to actuate the piston 310, 311 increases. Other types of adjustment members are possible and therefore, the particular adjustment members 206, 207 shown should not limit the scope of the present invention. For example, adjustment of the actuation pressure may comprise adjusting the area acted upon by the pressurized fluid. It can easily be appreciated that adjusting the exposed area of the pressure switch will adjust the force acting on the pressure switch for a given pressure.

According to an embodiment of the invention, the threshold pressure at which the first pressure switch 204 actuates is different from the threshold pressure at which the second pressure switch 205 actuates. More specifically, according to an embodiment of the invention, the first pressure switch 204 can be configured to actuate when the pressure reaches a low pressure threshold. Therefore, during normal operation when the pressure is above the low pressure threshold, the first pressure switch 204 may be de-actuated. Actuation of the first pressure switch 204 may send a signal indicating that the pressure of the system has dropped below a desired pressure.

According to an embodiment of the invention, the second pressure switch 205 may be configured to actuate when the pressure reaches a high pressure threshold. In other words, the second pressure switch 205 will be de-actuated during normal operation when the pressure of the system is below the high pressure threshold. Therefore, actuation of the second pressure switch 205 may send a signal indicating that the pressure of the system has exceeded a desired pressure. According to an embodiment of the invention, the low pressure threshold and the high pressure threshold can be separated by a desirable operating pressure range. Therefore, the system may have a given pressure tolerance defined between the low pressure threshold and the high pressure threshold. Advantageously, if neither the first pressure switch nor the second pressure switch is actuated, the pressure monitoring system 200 may indicate that the pressure of the system is within the acceptable operating range.

Figure 4:
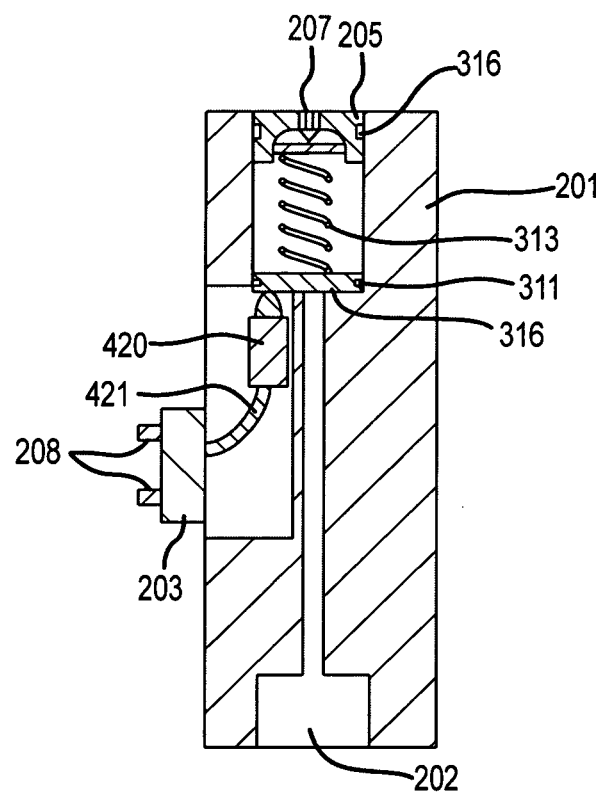
FIG. 4 shows another cross-sectional view of the pressure monitoring system according to an embodiment of the invention.

FIG. 4 shows another cross-sectional view of the pressure monitoring system 200 according to an embodiment of the invention taken along line 4-4 of FIG. 2. Visible in FIG. 4 is an electromechanical switch 420 associated with the pressure switch 205. It should be appreciated that the pressure switch 204 may likewise include a similar switch that is not visible in the figures. According to an embodiment of the invention, the switch 420 comprises an electromechanical switch, such as a micro-switch, for example. However, other types of switches may be used and the particular switch chosen should not limit the scope of the present invention. As can be seen, the electromechanical switch 420 can be coupled to the electrical connector 203 via lead 421, for example. Therefore, the electrical connector 203 allows the electromechanical switch 420 to communicate with an external device, for example. It should be appreciated that the pressure switch 204 likewise includes an electromechanical switch, which may also be coupled to the electrical connector 203. Advantageously, although more than one pressure switch is included in the pressure monitoring system 200, only one electrical connector 203 is required to extend from the housing 201. As a result, there is a reduction in the amount of wiring required to communicate with the pressure monitoring system 200.

In operation, a fluid fitting can be coupled to the fluid port 202. It should be appreciated that in some embodiments, this is the only required fluid fitting, thus reducing the number of fluid fittings to one, regardless of the number of pressure switches. However, in some embodiments, more than one fluid port may be provided. For example, more than one fluid port may be provided in order to accommodate various sized fluid fittings. One advantage of the present invention is the number of potential leak points is substantially reduced as compared to the prior art. Furthermore, it should be appreciated that the cost of the system can be reduced. Once the fluid fitting is coupled to the fluid port 202, pressurized fluid can be communicated to the pressure monitoring system 200. The pressure entering the pressure monitoring system 200 can act on both pressure switches 204, 205 with substantially equal pressure. The pressure switches 204, 205 can be adjusted to desired threshold pressures using the adjustment members 206, 207, for example. According to an embodiment of the invention, the first pressure switch 204 is adjusted to actuate at a low pressure threshold and the second pressure switch 205 is adjusted to actuate at a high pressure threshold. It should be appreciated however, that the pressures may vary from one application to another. For example, in some embodiments, it may be desirable to have the first pressure switch 204 actuate at a first pressure and the second pressure switch 205 actuate at a second pressure, where both the first and second pressures are above the normal operating pressure. Therefore, actuation of the first pressure switch 204 may trigger an alarm condition while actuation of the second pressure switch 205 may trigger an emergency shutdown, for example. Conversely, both of the pressure switches 204, 205 may be adjusted to actuate at pressures below the normal operating pressure and therefore indicate a loss of pressure. As another alternative embodiment, both pressure switches 204, 205 may actuate at substantially the same pressure. Therefore, the pressure monitoring system 200 would comprise a backup pressure switch in the event that one of the pressure switches fails. The use of a backup pressure switch may be required in certain implementations for various safety reasons.

According to an embodiment of the invention where the pressure switches 204, 205 are configured to actuate based on a low pressure threshold and a high pressure threshold, the pressure monitoring system 200 can determine whether the operating pressure is within the pre-determined operating pressure range. Therefore, during normal operation, the operating pressure will be great enough to overcome the biasing force of the biasing member 312. Therefore, the piston 310 will be raised away from the position shown in the figures. Conversely, because the biasing force of the biasing member 313 is adjusted to actuate at a high pressure threshold, the normal operating pressure will not be great enough to overcome the biasing force of the biasing member 313. Therefore, the piston 311 will be in substantially the same position as shown in the figures.

If during normal operation, the operating pressure falls below the pre-determined low pressure threshold, the biasing member 312 will overcome the low pressure to return the piston 310 to the position shown in the figures. According to an embodiment of the invention, the movement of the piston 310 can actuate the electromechanical switch 420. Therefore, the pressure monitoring system 200 can indicate that the operating pressure has dropped below the low pressure threshold.

Conversely, should the operating pressure exceed the high pressure threshold, the pressure will overcome the biasing member 313 of the second pressure switch 205 to actuate the piston 311. When the piston 311 actuates, the electromechanical switch 420 also actuates, thereby signaling that the operating pressure has exceeded the high pressure threshold. If appropriate action is taken to reduce the pressure, and the operating pressure again falls below the high pressure threshold, the biasing member 313 will again overcome the operating pressure to return the piston 311 to its first position, which is shown in the figures.

Figure 5:
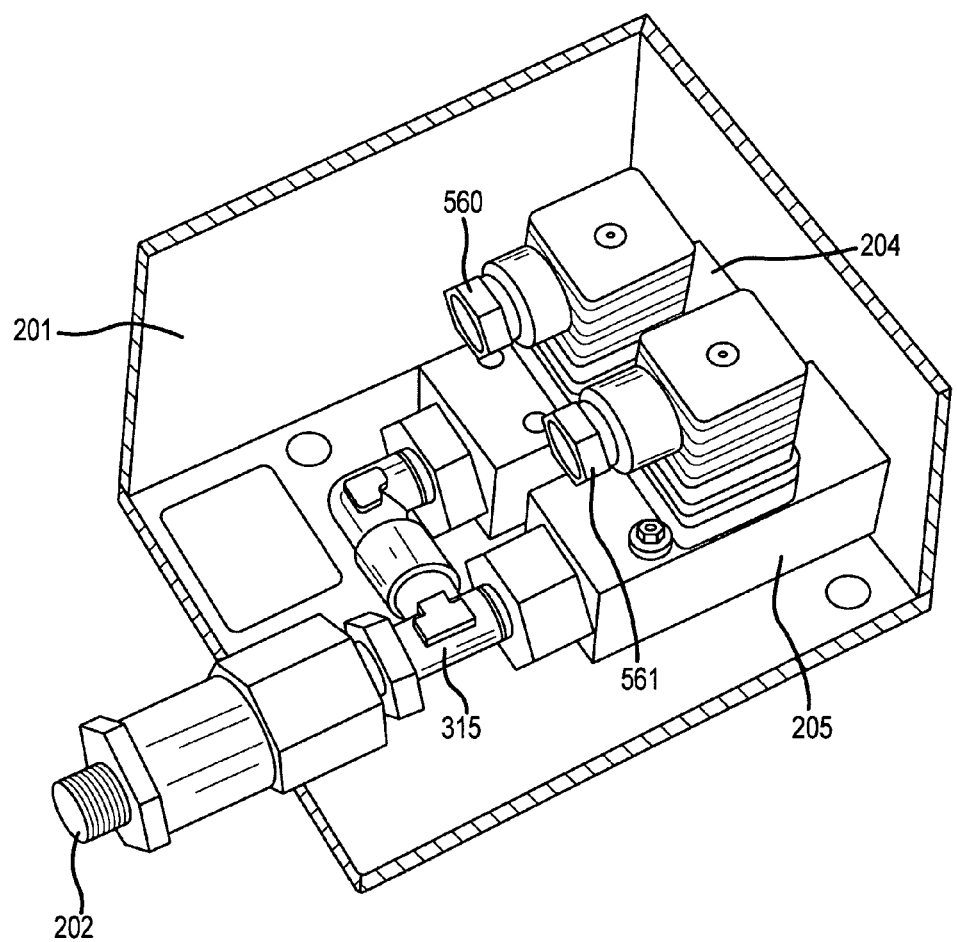
FIG. 5 shows a partial cross-sectional view of the pressure monitoring system according to another embodiment of the invention.

FIG. 5 shows a partial cross-sectional view of the pressure monitoring system 200 according to another embodiment of the invention. A portion of the housing 201 has been removed from FIG. 5 in order to show the internal components of the pressure monitoring system 200. In the embodiment shown in FIG. 5, the pressure switches 204, 205 are coupled to an interior of the housing 201; however, the housing does not include distinct pressure switch apertures as in the previously described embodiments. Rather, the housing 201 substantially surrounds the pressure switches 204, 205. However, it should be appreciated that because both pressure switches 204, 205 are positioned within the housing 201 and are in fluid communication with the single fluid port 202, that the number of fluid connections is still reduced to one while the space occupied by the pressure monitoring system 200 is kept to a minimum.

In addition to the components shown in the previous figures, FIG. 5 also shows individual electrical ports 560, 561. The electrical ports 560, 561 can be electrically coupled to the electrical connector 203 in order to provide the pressure monitoring system 200 with a single electrical connector 203.

As described above, the present invention provides a pressure monitoring system 200 that includes more than one pressure switch 204, 205 positioned within a single housing 201. According to an embodiment of the invention, the housing communicates with a pressurized fluid source 101 using a single fluid port 202. Advantageously, the number of fluid fittings coupled to the pressure monitoring system 200 can be substantially reduced. In some embodiments, an internally formed fluid channel 315 provides a communication path between the fluid port 202 and the pressure switches 204, 205. Therefore, each pressure switch 204, 205 can communicate with the single fluid port 202 without requiring additional fluid fittings. In addition, the pressure monitoring system 200 can include a single electrical connector 203 extending from the housing 201. Each of the pressure switches 204, 205 can be connected to the electrical connector 203. This allows each of the pressure switches 204, 205 to communicate with an external device while limiting the number of required connections to one. Therefore, the total number of connections required to implement the pressure monitoring system 200 is substantially reduced compared to the prior art. However, the performance of the pressure monitoring system 200 is not sacrificed as multiple threshold pressures can still be monitored.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other pressure switches, and not just to the embodiments described above and shown in the accompanying figures. Accordingly, the scope of the invention should be determined from the following claims.

We claim:

1. A pressure monitoring system (200), comprising:
   a housing (201);
   a fluid port (202) formed in the housing (201);
   a first pressure switch (204) positioned within at least a portion of the housing (201) and in fluid communication with the fluid port (202); and
   a second pressure switch (205) positioned within at least a portion of the housing (201) and in fluid communication with the fluid port (202).

2. The pressure monitoring system (200) of claim 1, further comprising a first pressure switch aperture (230) formed in the housing (201) and adapted to receive the first pressure switch (204) and at least a second pressure switch aperture (231) formed in the housing (201) and adapted to receive the second pressure switch (205).

3. The pressure monitoring system (200) of claim 1, further comprising a fluid channel (315) formed in the housing (201) and providing a fluid communication path between the fluid port (202) and the first and second pressure switches (204, 205).

4. The pressure monitoring system (200) of claim 1, further comprising an electrical connector (203) extending from the housing and in communication with the first pressure switch (204) and the second pressure switch (205).

5. The pressure monitoring system (200) of claim 1, further comprising:
   a first adjustment member (206) adapted to adjust a threshold actuation pressure of the first pressure switch (204); and
   a second adjustment member (207) adapted to adjust a threshold actuation pressure of the second pressure switch (205).

6. The pressure monitoring system (200) of claim 1, wherein one of the first or second pressure switches (204, 205) comprises a backup pressure switch and the first and second pressure switches (204, 205) are configured to actuate at substantially the same pressure.

7. A method for forming a pressure monitoring system including a housing and a fluid port formed in the housing, comprising the steps of:
   positioning a first pressure switch in at least a portion of the housing such that the first pressure switch is in fluid communication with the fluid port; and
   positioning a second pressure switch in at least a portion of the housing such that the second pressure switch is in fluid communication with the fluid port.

8. The method of claim 7, wherein the step of positioning the first pressure switch comprises inserting the first pressure switch into a first pressure switch aperture formed in the housing and wherein the step of positioning the second pressure switch comprises inserting the second pressure switch into a second pressure switch aperture formed in the housing.

9. The method of claim 7, wherein a fluid channel formed in the housing provides fluid communication between the fluid port and the first and second pressure switches.

10. The method of claim 7, further comprising the steps of extending an electrical connector from the housing and providing electrical communication between the electrical connector and the first pressure switch and the second pressure switch.

11. The method of claim 7, further comprising the steps of:
    adjusting the first pressure switch to actuate at a first threshold actuation pressure; and
    adjusting the second pressure switch to actuate at a second threshold actuation pressure.

12. The method of claim 7, wherein one of the first or second pressure switches comprises a backup pressure switch and the first and second pressure switches are configured to actuate at substantially the same pressure.

\* \* \* \* \*